United States Patent [19]

Bosman

[11] 4,225,430
[45] Sep. 30, 1980

[54] BIOLOGICAL PROCESS

[75] Inventor: Johanna Bosman, Sandton, South Africa

[73] Assignee: AECI Limited, Johannesburg, South Africa

[21] Appl. No.: 920,624

[22] Filed: Jun. 29, 1978

Related U.S. Application Data

[63] Continuation-in-part of Ser. No. 806,166, Jun. 13, 1977, abandoned.

[30] Foreign Application Priority Data

Jun. 25, 1976 [ZA] South Africa ............... 76/3788

[51] Int. Cl.$^2$ .............................................. C02C 1/04
[52] U.S. Cl. ............................. 210/610; 210/618; 210/903
[58] Field of Search ....................... 210/2–9, 210/11, 16, 17, DIG. 28

[56] References Cited

U.S. PATENT DOCUMENTS

| | | | |
|---|---|---|---|
| 1,194,933 | 8/1916 | Barber | 210/8 |
| 3,617,540 | 11/1971 | Bishop et al. | 210/16 |
| 3,846,289 | 11/1974 | Jeris et al. | 210/8 |
| 3,939,068 | 2/1976 | Wendt et al. | 210/16 |
| 4,043,936 | 8/1977 | Francis et al. | 210/DIG. 28 |

FOREIGN PATENT DOCUMENTS

| | | | |
|---|---|---|---|
| 50-106861 | 8/1975 | Japan | 210/DIG. 28 |
| 1462736 | 1/1977 | United Kingdom | 210/16 |

OTHER PUBLICATIONS

Sen et al., "Anaerobic Digestion of Liquid Molasses Distillery Wastes," WPCFJ, Oct. 1962, pp. 1015–1025.

Primary Examiner—Charles N. Hart
Assistant Examiner—Peter A. Hruskoci
Attorney, Agent, or Firm—Cushman, Darby & Cushman

[57] ABSTRACT

A process for denitrifying a highly nitrogenous wastewater in the presence of high concentrations of ammonia is described. The process is based on upflow packed bed and fluidized bed reactors containing denitrifiers on the packing material. A carbon source, e.g. molasses, is metered into the wastewater as a source of carbon and energy to the bacteria. Excess bacteria are removed by hydraulic shear.

14 Claims, 1 Drawing Figure

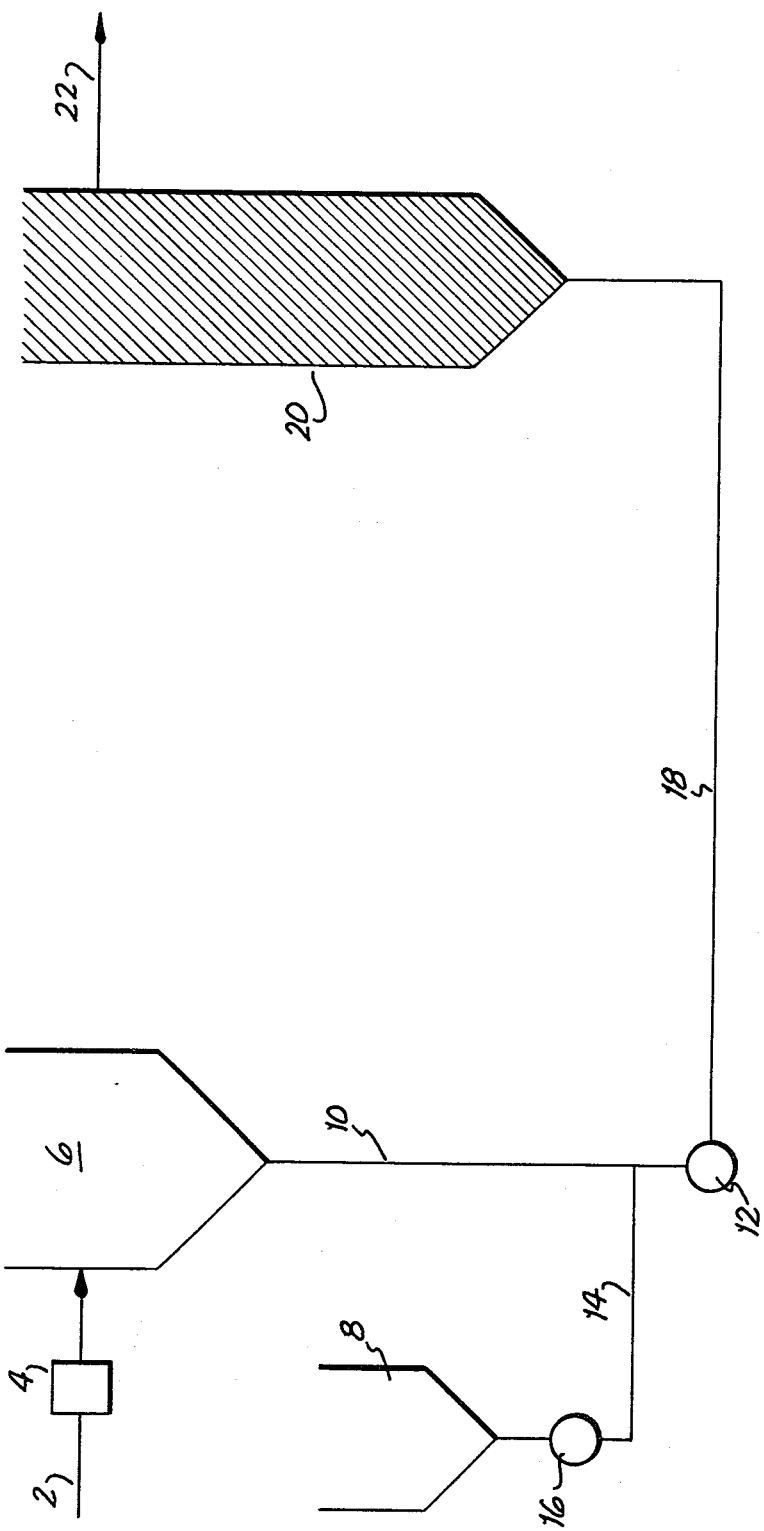

BIOLOGICAL PROCESS

CROSS REFERENCE TO RELATED APPLICATIONS

This application is a continuation-in-part of U.S. application Ser. No. 806,166, filed June 13, 1977 now abandoned, which is incorporated by reference herein. Said prior application is directed to a method of denitrifying a strongly nitrogenous effluent, wherein the nitrogen content exceeds 150 mg/l, comprising charging a packed reactor with denitrifying bacteria, being heterotrophic and facultative anaerobes, and passing the effluent mixed with a predetermined amount of a carbon source at a predetermined flow rate through the reactor, the flow rate, amount of carbon source and reactor and process variables being selected for a desired denitrification of the effluent.

Considerable research effort has been directed to processes for removing nitrogen from domestic and agricultural wastewaters where the nitrate concentration seldom exceeds 100 mg/l $NO_3$—N. These processes have been based on activated sludge, packed bed and fluidized bed denitrification technology.

These processing designs have proved satisfactory for removing low levels of nitrate from wastewater but have not been successfully applied to wastewater containing high levels of nitrate. High levels of ammonia, which is toxic to bacteria above certain levels, constitute a further problem in denitrification of high nitrogen-content wastewater effluents.

The present invention involves a method of removing nitrate nitrogen from wastewater effluents containing high concentrations of nitrate nitrogen, in excess of 1000 mg/l, in the presence of in excess of 1000 mg/l ammonia. Typically wastewater effluents from fertilizer and explosives manufacture or from nuclear fuel processing operation exhibit the aforementioned high levels of nitrate and ammonia. The invention is further concerned with eliminating severe clogging of apparatus used in the denitrifying processes; clogging of said apparatus occurs as a result of biomass accumulation during denitrifying processes. Biomass accumulation is the result of excess bacterial growth, during denitrification, on particles used in the denitrification medium.

One prior art method of coping with the apparatus clogging problem, in denitrification of high nitrogen-content nitrogenous waste waters, is disclosed in U.S. Pat. No. 4,043,936. In U.S. Pat. No. 4,043,936 clogging of a conical-shaped packed bed reactor is remedied by intermittently expanding the bed, commonly referred to as "bumping." Particles are accordingly separated by the increased flow, resulting from the expansion of the bed, and excess biomass is washed off. This method of "bumping" has the obvious disadvantage of severely interfering with smooth operation of the process.

In U.S. Pat. No. 3,846,289, methods of obviating biomass build-up in processes for denitrifying low nitrogen content waste water effluents are disclosed and include removing part of the biomass from the reactor and (1) agitating and abrading the removed portion of biomass to remove excess bacteria therefrom or (2) subjecting it to the action of compressed air or water sprays.

Both of the aforementioned processes involve the periodic treatment of accumulated biomass.

The fluidized bed technology disclosed in U.S. Pat. No. 3,846,289 for denitrification of low-nitrogen content waste water effluents is inapplicable to high nitrogen-content waste water effluents. In the process of this patent, bacteria on a fluidized sand packing are cultivated on methanol as a source of carbon and sand is fluidized by the inflow waste water which is denitrified by organisms on the sand. The water velocity, needed to fluidize the sand, in the process of U.S. Pat. No. 3,846,289, would not result in a sufficiently long hydraulic retention time in the reactor to complete the denitrification reaction of high nitrogen-content waste water effluents.

It is an object of the invention to provide a process for denitrifying high nitrogen content waste water effluents.

Furthermore, it is an object of the invention to continuously remove excess biomass from high nitrogen content denitrification media without periodically interrupting the denitrification reaction and to establish a balance between bacterial growth rate and biomass removal.

SUMMARY OF THE INVENTION

The invention which satisfies the foregoing objects includes simultaneously (a) feeding to a reactor a feed of high-nitrogen content waste water effluent together with denitrifying bacteria and a carbon source for a period of time sufficient to substantially denitrify said effluent and (b) passing into the reactor a recycle stream which is substantially denitrified effluent back into the reactor, wherein the ratio of recycle stream to feed ranges from 2 to 200 and wherein the linear velocity of said recycle through the reactor is high enough to remove continuously some of the biomass from the medium and thereby establish a balance between bacterial growth rate and biomass wash off. The linear velocity can be controlled to optimize hydraulic retention times in the reactor containing the denitrification medium by employing carbon sources which support maximum denitrification rates. The linear velocity of liquid in the reactor can range from 4 to 200 $m^3/m^2/hr$.

DETAILED DESCRIPTION OF THE INVENTION

High nitrogen content waste water effluents which can be denitrified in accordance with the invention, include those containing in excess of 1000 mg/l nitrate nitrogen in the presence of in excess of 1000 mg/l ammonia nitrogen.

These high nitrogen content waste water effluents, hereinafter referred to as "feeds," are passed into a denitrification medium contained in a reactor which is a stirred tank reactor or pond, a fluidized bed reactor or a packed bed reactor. As indicated above the feed to be treated is admixed, on introduction into the reactor, with a recycle stream which is a substantially denitrified effluent. The volume ratio of said recycled stream ranges from 2 to 200.

When the reactor is a packed column reactor, the column packing and design should be selected for the optimum distribution of effluent. Preferably the voidage of the packing is in the range 64 to 93 percent, for example, of the order of 90 percent, and the available surface area is in the range 85 to 341 $m^2/m^3$, for example of the order of 140 $m^2/m^3$. Any suitable packing providing these characteristics may be employed. ACTIFIL (Norton Company, USA) has been found to be suitable. Suitable packed column reactors are disclosed in U.S.

Pat. No. 4,043,936 which is incorporated by reference herein. In a packed column, the recycle stream is fed (recycle ratio between from 2 to 200) to the reactor at a rate to provide a linear velocity of between from 4 and 9 $m^3/m^2/hr$. to establish the balance between bacterial growth rate and biomass washoff rate and to insure good liquid distribution.

The reactor can be a fluidized bed reactor. The bed may be of sand of mean particle size range of about 0.13 to 1 mm. Suitable fluidized bed reactors are disclosed in U.S. Pat. No. 3,846,289, which is incorporated by reference herein.

In a fluidized bed reactor, the recycled stream (recycle volume ratio between from 2 to 200, as above) is fed to the reactor at a rate sufficient to effect a linear velocity of between from 18 and 200 $m^3/m^2/hr$. in the reactor to effect and keep a desired bacterial level on the particulate material. Bed expansions range between 5 to 150%, preferably between 40 and 100%, with a typical value being 50%. The size of the reactor, flow rate of effluent through the reactor and other parameters may be selected according to the particular effluent being treated. Generally the reactor will be designed to accommodate a flow rate of the order of 50 $m^3/h$. The reactor is provided with a recycle system to effect sufficiently rapid flow through the reactor to effect good distribution of components in the denitrification medium and to effect hydraulic shear effective to prevent excessive biomass accumulation on the reactor packing. Good distribution is important. Dead water in which competing fermentation processes, other than denitrification occur, can lead to eventual failure of the denitrification process.

The packing or bed particles in the reactor are charged with bacteria (acclimated to high nitrate and molasses concentrations) by pumping the bacteria into the reactor and allowing time for adherence on the packing. The bacteria are heterotrophic and facultative anaerobes. Charging of the packing or bed particles is usually undertaken in a stage preliminary to the process.

Raw effluent feed is admixed with a carbon source. The carbon source is molasses or any other biodegradeable carbon source, for example, methanol or carbonaceous waste. Preferably, the carbon source used is molasses since molasses was found to support faster denitrification rates, compared to e.g. methanol, thus resulting in shorter overall hydraulic retention times.

The pH of the mixture of the effluent fed to the reactor and carbon source should not exceed 9.5 and is preferably in the range 6.0 to 7.5. At higher pH values where ammonia is present, the denitrifying bacteria are seriously inhibited.

The COD:N ratio of the effluent fed to the reactor should be maintained in the range 6:1 to 3:1 and is preferably as low as possible in order to operate as economically as possible. An additional advantage is that this also reduces sludge build-up.

One embodiment of a method of the invention is now discussed generally with reference to the accompanying flowsheet.

Referring to the flowsheet, a denitrification plant comprises an effluent feed line 2, a filter and screen assembly 4, an effluent reservoir 6, a molasses reservoir 8, an effluent line 10 from the reservoir 6 leading to a pump 12 and a molasses line 14 containing a metering pump 16 leading from the reservoir 8 into the line 10. A line 18 leads from the pump 12 into the bottom of a packed column 20 and a discharge out line 22 leads from the top of the column 20 to recycle surge tank 24. A recycle pump 28 draws recycle treated effluents from 24 to line 30 where it is admixed with high nitrogen-content effluents, and the admixture is fed to the reactor.

Effluent is treated in the above plant as follows: The packing of the column 20 is first charged with bacteria (acclimated to high nitrate and molasses concentrations) by pumping them into the column 20 and allowing time for adherence on the packing.

Raw effluent is fed to the plant along line 2, filtered and screened in the assembly 4, and stored in the reservoir 6. Raw effluent is fed from the reservoir 6 to the pump 12 wherein it is mixed with molasses fed from the reservoir 8 by the metering pump 16 through the line 14. The mixture is fed along lines 18 and 30 to the packed column 20 and passes up the column 20. At the same time recycled treated effluent stream from recycle storage tank 24 flows through line 30. The recycle stream is pumped to line 30 at a rate sufficient to effect a linear velocity within the reactor of from 4 to 200 $m^3/m^2/hr$.

The following Examples illustrate some specific results obtained by using a plant of the type described above.

EXAMPLE 1

Packed Column

Raw effluent ex DAM IV, AECI factory is mixed with molasses and fed to a pilot scale column packed with ACTIFIL while recycled pretreated effluent was also introduced into the column. The packing had been previously charged with suitable denitrifying bacteria being heterotrophic and facultative anaerobes, by pumping in activated sludge. Denitrification conditions and results are set forth below.

Effluent Composition
$NO_3$—N: 2000 mg/l
$NH_3$—N: 2000 mg/l
COD:$NO_3$—N: 5:1
Feed rate: 0.5 $m^3/h$
Recycle: 6.5 $m^3/h$
Recycle feed ratio: 13:1 (recycle:feed)
Linear velocity: 4 $m^3/m^2/hr$
Outflow Composition
$NO_3$—N: 100 mg/l
$NH_3$—N: 2000 mg/l
Nitrate Reduction: 95%

EXAMPLE 2

Fluidized Bed

Effluent ex DAM IV, AECI Factory mixed with molasses and fed to pilot scale column containing sand of 0.9 mm mean diameter. The sand had been previously charged with suitable denitrifying bacteria, being heterotrophic and facultative anaerobes. Bed expansion 33%. Denitrification conditions and results are set forth below:

Effluent Composition
$NO_3$—N: 2000 mg/l
$NH_3$—N: 2000 mg/l
COD:$NO_3$—N: 4:1
Feed rate: 0.5 $m^3/hr$
Recycle: 6.5 $m^3/hr$
Recycle feed ratio: 13:1
Linear velocity: 69 $m^3/m^2/hr$
Outflow Composition
$NO_3$—N: 20 mg/l NH$_3$—N: 2000 mg/l
Nitrate Reduction: 99%

EXAMPLE 3

Effluent ex DAM IV, AECI Factory, Modderfontein, Transvaal was mixed with molasses and fed to a laboratory scale column (4.3 cm diameter), containing sand of 0.9 mm mean diameter; the sand had been charged with bacteria, as in the above Examples. Bed expansion 10-200%.
Effluent Composition
NO$_3$—N: 2000 mg/l
NH$_3$—N: 2000 mg/l
COD:NO$_3$—N: 4:1
Feed rate: 35 cm$^3$ min$^{-1}$
Recycle: 609 cm$^3$ min$^{-1}$–4900 cm$^3$ min$^{-1}$
Recycle feed ratio: 17:1-150:1
Linear velocity: 0.7-5.4 cm sec$^{-1}$ (25-194 m$^3$/m$^2$/h)
Nitrate loading removed: 2777 mg NO$_3$—N h$^{-1}$, l$^{-1}$ reactor volume
Outflow Concentration of Nitrogeneous Materials
NO$_3$—N: 20 mg/l
NH$_3$—N: 2000 mg/l
% NO$_3$—N reduction: 99%

The parameters were varied over a large range of values. The example, which includes several experiments, serves to indicate the wide range of possible operating conditions.

The denitrification exceeded 90 percent. In some cases even this level is unacceptable, for example, if the effluent is to be discharged into a public stream. For higher denitrification the COD:N ratio may be increased, say to 4:1, residual COD being removed by a subsequent aeration step.

The advantages of the process are accordingly immediately apparent. The recycle process of the invention allows for continuous removal of excessive biomass accumulation rather than periodic removal of biomass as is taught by the prior art discussed above. Further, it is generally accepted that at least the stoichiometric COD:N ratio, with preferably an additional 30 percent for growth, is necessary (a COD:N=4.9:1 is recommended by many workers in the field. Reference McCarty, P. L. Beck L., St. Amant P., *Biological Denitrification of Waste Waters by Addition of Organic Materials*. Proc. 24th Industrial Waste Conf., Purdue University, (1969), 1271-1285).

What is claimed is:

1. A method for denitrifying a high nitrogen content waste water effluent comprising
   (i) passing a feed of said waste water effluent through a packed bed reactor containing denitrifying bacteria which are heterotrophic and facultative anaerobes on the packing material to denitrify said waste water effluent
   wherein the feed has a pH of 6 to 7.5, a nitrate nitrogen concentration in excess of 1000 mg/l and ammonia nitrogen in excess of 1000 mg/l and is admixed with molasses, as a carbon source, in an amount sufficient to effect the denitrification of said waste water effluent; and
   (ii) simultaneously and continuously passing a recycle stream which is a substantially denitrified stream of the waste water feed of (i) through the bed, in a volume such that the volume ratio of recycle stream to feed ranges from 2 to 200
   wherein the volume and rate of recycle stream in (ii) are sufficient to effect a linear velocity of the combined feed and recycle stream through the bed ranging from 4 to 200 m$^3$/m$^2$ hr,
   and to effect a hydraulic shear within the bed which continuously remove accumulated biomass which is in excess of that required to effect denitrification.

2. The method of claim 1, wherein said feed admixed with molasses has a COD:nitrogen value of 4:1.

3. The method of claim 1, wherein said recycle stream ratio is at least 10:1.

4. The method of claim 3, wherein the COD:nitrogen ratio is 3:1.

5. The method of claim 1, wherein said packed bed reactor is a fluidized bed reactor and wherein said linear velocity ranges from 69 to 200.

6. The method of claim 5, wherein said recycle stream:feed volume ratio is 10:1 to 100:1.

7. The method of claim 5, wherein sand of a mean particle size of about 0.9 mm diameter forms said bed.

8. The method of claim 1, wherein the packing material has a voidage in the range 64 to 93 percent and an available surface area in the range 35 to 341 m$^2$/m$^3$.

9. The method of claim 8, wherein the voidage is of the order of 90 percent and the surface area is of the order of 140 m$^2$/m$^3$.

10. The method of claim 1, wherein the COD:nitrogen ratio of the feed fed to the bed is 6:1 to 3:1.

11. The method of claim 1, wherein the pH of the feed fed to the reactor in (i) is adjusted to 6 to 7.5.

12. The method of claim 1, wherein the pH of the feed in (i) is 6 to 7.5.

13. The method of claim 1, wherein the pH of the feed of (i) does not exceed 9.5.

14. The method of claim 1, wherein said feed and said recycle stream are passed upwardly through a fluidized bed.

* * * * *